UNITED STATES PATENT OFFICE.

CARL MOLDENHAUER, OF FRANKFORT-ON-THE-MAIN, GERMANY.

PROCESS OF PRECIPITATING GOLD OR OTHER PRECIOUS METALS FROM THEIR SOLUTIONS.

SPECIFICATION forming part of Letters Patent No. 522,739, dated July 10, 1894.

Application filed May 5, 1894. Serial No. 510,146. (No specimens.)

*To all whom it may concern:*

Be it known that I, CARL MOLDENHAUER, a subject of the Emperor of Germany, resident at Frankfort-on-the-Main, in the Empire of Germany, have invented certain new and useful Improvements in Processes of Precipitating Gold and other Precious Metals Out of their Solutions, of which the following is a specification.

In the Letters Patent No. 512,046, granted to me on January 2, 1894, gold and other precious metals were precipitated out of their cyanide solutions by means of aluminum in presence of a free alkali or alkaline earth, the aluminum serving for the purpose of regenerating the solution. In following up my researches, I have found that the required quantity of free alkali which is necessary for the regeneration of the solution, is not required to be necessarily present during the precipitating of the gold or other precious metal from the solution, but that it can be added to the solution after the precipitation has taken place, provided that a solution is used which contains a free acid, but not a free alkali. In this case and when for instance sulfuric acid is present in the solution, the reaction and the precipitation of gold takes place in compliance with the following equation:

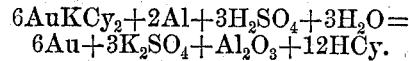

$$6AuKCy_2 + 2Al + 3H_2SO_4 + 3H_2O = 6Au + 3K_2SO_4 + Al_2O_3 + 12HCy.$$

As shown by the equation, the reaction produces free cyanic-acid in addition to alumina and potassium sulfate which latter is indifferent to the dissolution of gold in the solution. This free cyanic-acid, in itself, is not capable in an aqueous solution of dissolving gold out of its ores and for this reason it is not possible to speak, in the precipitation of gold from acid cyanide solutions, of the direct regeneration of the solution, as can be done when gold is precipitated by aluminum in the presence of a free alkali. When however, a free alkali is added to the solution, which remains after the precipitation of the gold, the alkali unites with the free cyanic-acid present in the solution and forms a cyanide, which is capable of dissolving a new quantity of gold from its ores. In face of the free alkali, an alkaline earth, such as lime, can be used. In this case sulfate of lime is precipitated, and the alkali which was before united with the sulfuric acid becomes free and forms with the cyanic-acid an alkali cyanide. When there is only a small quantity of free sulfuric acid in the solution, it can form besides alkali cyanide also calcium cyanide, which has likewise the quality of dissolving gold from its ores. In this manner, it is possible to obtain even in acid solutions a regeneration of the gold-dissolving cyanide-solution. This is of especial value in cases in which by the dissolving of the gold from pyritical ores free sulfuric acid is formed in the solution, or in cases in which the presence of this acid in the solution is due to any other cause.

Having thus described my invention, I claim as new and desire to secure by Letters Patent—

The process herein described of dissolving gold and other precious metals from their ores by means of acid cyanide-solutions, which consists in treating the solution with aluminum, so as to precipitate the gold from the solution, and then adding a free alkali or alkaline earth to the remaining liquor for regenerating the solution, substantially as set forth.

In testimony that I claim the foregoing as my invention I have signed my name in presence of two subscribing witnesses.

CARL MOLDENHAUER.

Witnesses:
ALVESTO S. HOGUE,
JEAN GRUND.